United States Patent
Kuttenberger et al.

(10) Patent No.: US 11,240,489 B2
(45) Date of Patent: Feb. 1, 2022

(54) TESTING METHOD FOR A CAMERA SYSTEM, A CONTROL UNIT OF THE CAMERA SYSTEM, THE CAMERA SYSTEM, AND A VEHICLE HAVING THIS CAMERA SYSTEM

(71) Applicant: Robert Bosch GmbH, Stuttgart (DE)

(72) Inventors: Alfred Kuttenberger, Weil der Stadt (DE); Marco Kruse, Renningen (DE); Michael Bunz, Waldenbuch (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/753,991

(22) PCT Filed: Oct. 19, 2018

(86) PCT No.: PCT/EP2018/078728
§ 371 (c)(1),
(2) Date: Apr. 6, 2020

(87) PCT Pub. No.: WO2019/096541
PCT Pub. Date: May 23, 2019

(65) Prior Publication Data
US 2020/0396441 A1 Dec. 17, 2020

(30) Foreign Application Priority Data
Nov. 14, 2017 (DE) .......................... 102017220282.3

(51) Int. Cl.
*H04N 17/00* (2006.01)
*B60R 11/04* (2006.01)
*H04N 7/18* (2006.01)

(52) U.S. Cl.
CPC .......... *H04N 17/002* (2013.01); *B60R 11/04* (2013.01); *H04N 7/18* (2013.01)

(58) Field of Classification Search
CPC .......... H04N 17/002; H04N 7/18; B60R 11/04
(Continued)

(56) References Cited

U.S. PATENT DOCUMENTS 5,850,254 A * 12/1998 Takano .............. G06K 9/00791
348/148
2008/0129826 A1 6/2008 Musunuri et al.
(Continued)

FOREIGN PATENT DOCUMENTS

DE 102014008808 A1 11/2014
DE 112016003673 T5 4/2018
(Continued)

OTHER PUBLICATIONS

International Search Report for PCT/EP2018/078728, dated Jan. 29, 2019.

*Primary Examiner* — Michael Lee
(74) *Attorney, Agent, or Firm* — Norton Rose Fulbright US LLP; Gerard Messina

(57) ABSTRACT

A testing method for a camera system having a control unit and at least one camera. The control unit carries out the following method steps immediately after loading of an operating system of the control unit: generating transmittable image data as a function of at least one source image loaded from an electronic camera memory of the camera; transmitting the generated image data from the camera to the control unit; generating an intermediate image as a function of the received image data in the control unit; ascertaining a processed image as a function of the generated intermediate image in the control unit; comparing the processed image to at least one reference image, the reference image being loaded from a memory; and generating an error signal in the event of a deviation between the processed image and the reference image.

11 Claims, 3 Drawing Sheets

(58) Field of Classification Search
USPC .......................................................... 348/148
See application file for complete search history.

(56) References Cited

U.S. PATENT DOCUMENTS

| | | | |
|---|---|---|---|
| 2010/0165105 A1* | 7/2010 | Mizusawa | G08G 1/16 |
| | | | 348/148 |
| 2012/0293659 A1* | 11/2012 | Bandou | H04N 5/23238 |
| | | | 348/148 |
| 2015/0281684 A1 | 10/2015 | Beck et al. | |
| 2016/0295205 A1 | 10/2016 | Lim et al. | |
| 2016/0343136 A1* | 11/2016 | Heidi | G06T 7/80 |
| 2017/0054974 A1* | 2/2017 | Pliefke | H04N 17/002 |
| 2019/0141313 A1* | 5/2019 | Kishiwada | H04N 13/239 |

FOREIGN PATENT DOCUMENTS

| | | |
|---|---|---|
| EP | 3094075 A1 | 11/2016 |
| JP | 2009246803 A | 10/2009 |
| JP | 2016085721 A | 5/2016 |
| WO | 2005050941 A2 | 6/2005 |
| WO | 2017026454 A1 | 2/2017 |
| WO | 2017052663 A1 | 3/2017 |

\* cited by examiner

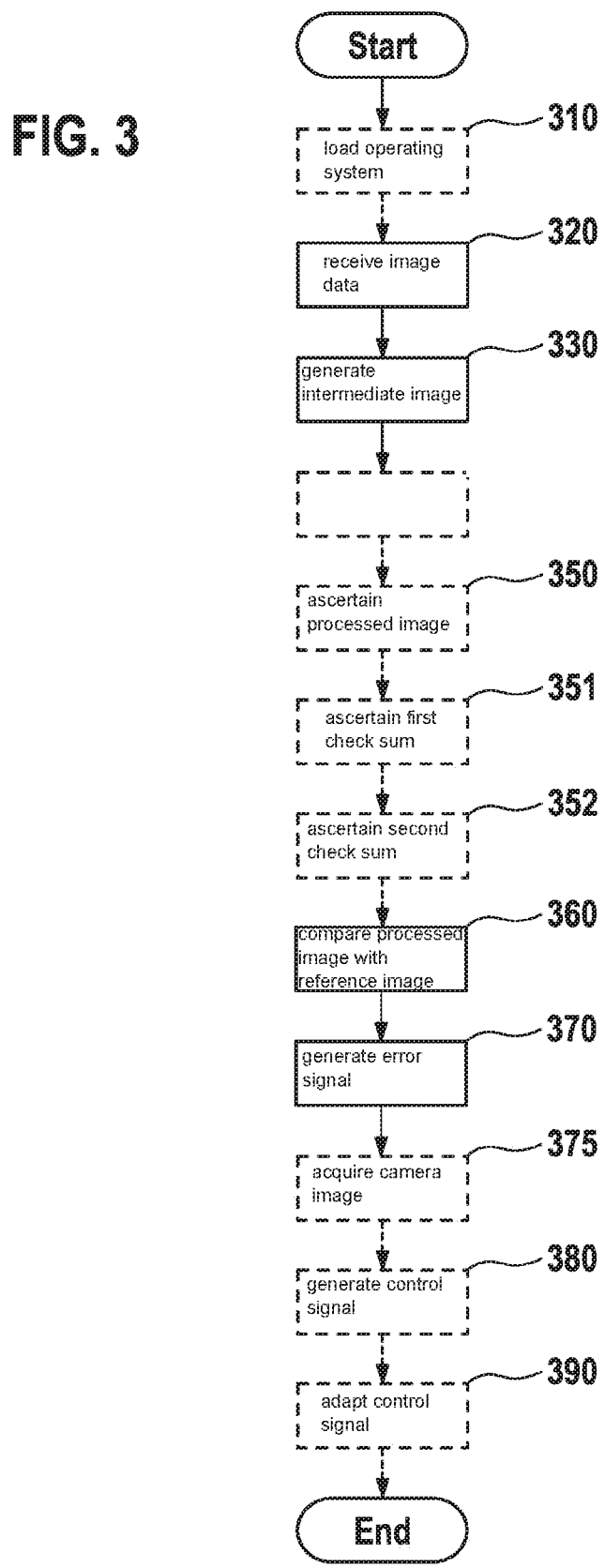

TESTING METHOD FOR A CAMERA SYSTEM, A CONTROL UNIT OF THE CAMERA SYSTEM, THE CAMERA SYSTEM, AND A VEHICLE HAVING THIS CAMERA SYSTEM

FIELD

The present invention relates to a testing method for a camera system, to the control unit of the camera system and the camera system for carrying out the testing method, and it also relates to a vehicle having the camera system.

BACKGROUND INFORMATION

PCT Application No. WO 2017/052663 A1 describes a device and a method for transmitting test patterns via physical data channels.

PCT Application No. WO 2005/050941 A2 describes a memory module and a method for operating a memory module.

SUMMARY

The present invention relates to a testing method for a camera system, the camera system having a control unit and at least one camera. An example testing method in accordance with the present invention begins immediately after loading of an operating system of the control unit, by generating transmittable image data as a function of at least one source image loaded from an electronic camera memory of the camera. The generated image data are subsequently transmitted from the camera to the control unit. An intermediate image is then generated as a function of the image data received from the control unit. This is followed by an ascertainment of a processed image as a function of the generated intermediate image. In a further step, the processed image is compared to a reference image, the reference image being loaded from a memory of the control unit. An error signal will be generated in the event of a deviation between the processed image and the reference image. This offers the advantage that the operation of the control unit of the camera system and a transmission of the image data between the camera and the control unit are checked for an automated or partially automated control of a vehicle in road traffic. In an advantageous manner, the testing method therefore checks the safety-critical basic functions of the camera system and generates an error signal if the camera system does not function as intended.

In one preferred development of the present invention, the at least one source image represents a test pattern, the test pattern advantageously having different brightness values, different gray values, different pixel environments and/or different color values in each case. In this way, the transmission paths and the ascertainment of a processed image are checked for different image content.

In one especially preferred specific embodiment of the present invention, after the processed image has been ascertained, a first check sum is ascertained as a function of specific image information of at least two image pixels of the processed image. The image information is allocated to an image pixel in each case and may correspond to the pixel content of the processed image or be optionally determined with the aid of an algorithm as a function of the pixel content and/or the image pixels adjacent to the image pixel. For example, the image information is a gray scale value and/or a brightness and/or a descriptive measure for the image pixels surrounding the image pixel. The ascertainment or a readout of a second check sum of the reference image then takes place. The ascertainment of the second check sum of the reference image is provided as a function of the image information of at least two image pixels of the reference image. The readout of the second check sum from a memory of the control unit may be provided as an alternative. In this particular development, the comparison of the processed image to the reference image is carried out as a function of the first check sum and/or the second check sum. In this development the comparison of the processed image to the reference image is effective, i.e., the comparison requires few computational operations and is reliable and fast.

In a further specific embodiment of the present invention, the ascertaining of the at least one processed image is additionally preferably carried out as a function of test parameters. The test parameters represent standard parameters in the algorithms for generating the intermediate image and/or for ascertaining the processed image. This has the advantage that the parameters in the calculations are reset to the standard parameters if an adaptation of the parameters in the algorithms, e.g., to the brightness, takes place during the normal operation.

In a further specific development of the present invention, it may be provided that at least one camera image of the camera is acquired after the error signal has been generated. A control signal from the control unit is subsequently generated as a function of the acquired camera image. The control signal is configured to actuate a steering motor, a drive motor, a brake and/or a display device of the vehicle. The control signal is adapted as a function of the generated error signal. In this further development, the control of a vehicle is prevented in the event of a detected error that is represented by the generated error signal. This prevents the control unit from leading the vehicle into safety-critical driving situations.

The present invention also relates to the control unit for the camera system. In accordance with the present invention, an example control unit is configured to receive image data from a camera of the camera system immediately after the loading of an operating system of the control unit with the aid of a receiving unit. Moreover, in the event of a deviation between a processed image and a reference image, the control unit is configured to generate an error signal, the processed image being ascertained with the aid of a processing unit as a function of the received image data, and the reference image being loaded from a memory of the control unit.

In addition, the present invention relates to a camera system for a vehicle. The camera system includes at least one camera and the control unit according to the present invention. The camera system is developed to carry out the testing method.

Moreover, the present invention relates to a vehicle having the camera system.

Additional advantages result from the following description of exemplary embodiments with reference to the figures.

BRIEF DESCRIPTION OF THE DRAWINGS

FIG. 3 shows a method sequence in the form of a block diagram.

DETAILED DESCRIPTION OF EXAMPLE EMBODIMENTS

Figure 1:
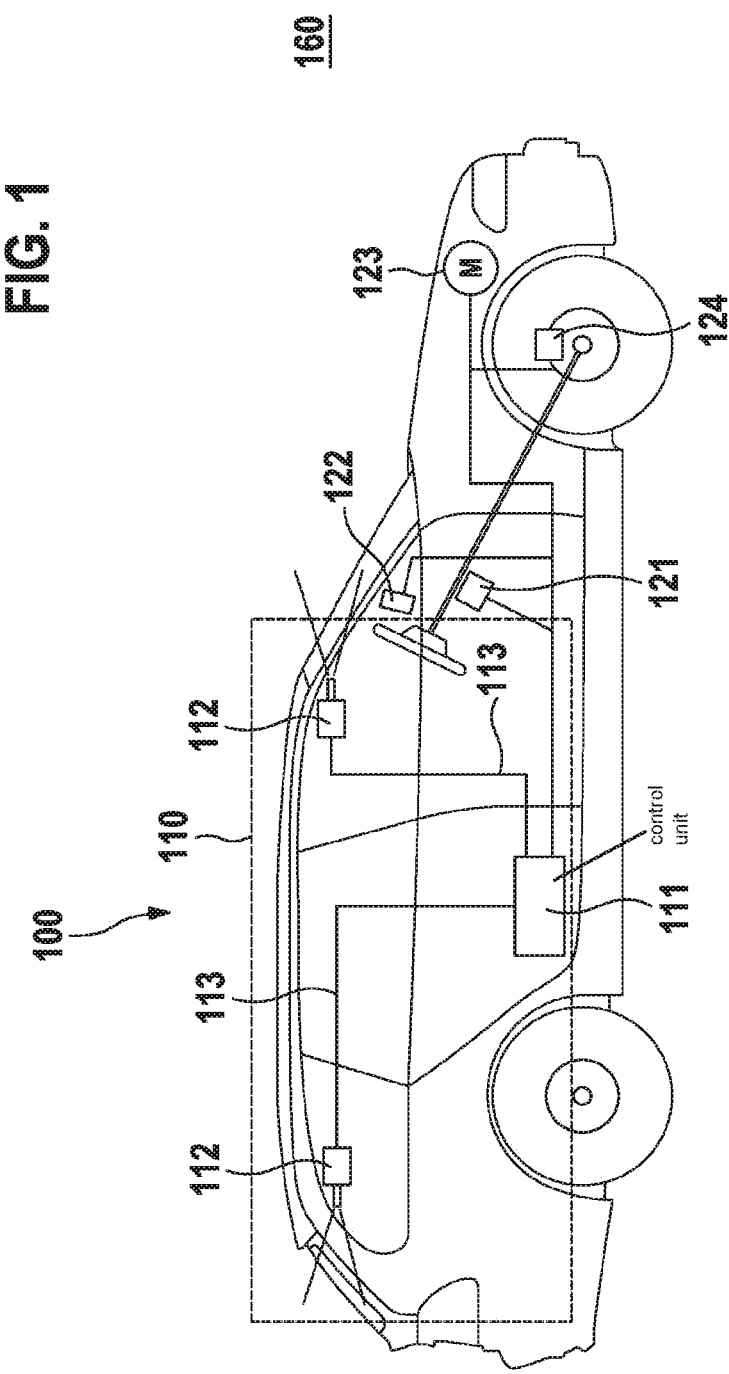
FIG. 1 shows a vehicle having the camera system.

FIG. 1 shows a vehicle 100. A camera system 110 is situated on vehicle 100. Camera system 110 has at least one control unit 111 and at least one camera 112, FIG. 1 showing two cameras 112 by way of example. Control unit 111 and the at least one camera 112 are connected by a data cable 113 for the transmission of image data from camera 112 to control unit 111. Alternatively, the transmission of the image data from camera 112 to control unit 111 is able to be carried out without a cable, via radio, such as by a WLAN or Bluetooth connection. The control unit has a receiving unit for receiving the image data. If a connection is implemented with the aid of the data cable, the receiving unit is a plug interface, for instance. Control unit 111 is configured to generate a control signal for the control of vehicle 100 as a function of at least one camera image from camera 112, the control signal being configured to actuate a steering motor 121, a display device 122, a drive motor 123 and/or a brake 124 of vehicle 100. For instance, the control of vehicle 100 is carried out as a function of the camera images acquired in an automatic or semi-automatic manner with the aid of camera system 110. Automatic parking of vehicle 100, for example, is controlled, the camera images preferably also being displayed to the driver of vehicle 100 on display device 122. The reliability of the function of control unit 111 is safety-relevant for passengers of vehicle 100 and for third vehicles or persons in environment 160 of vehicle 100.

Figure 2:
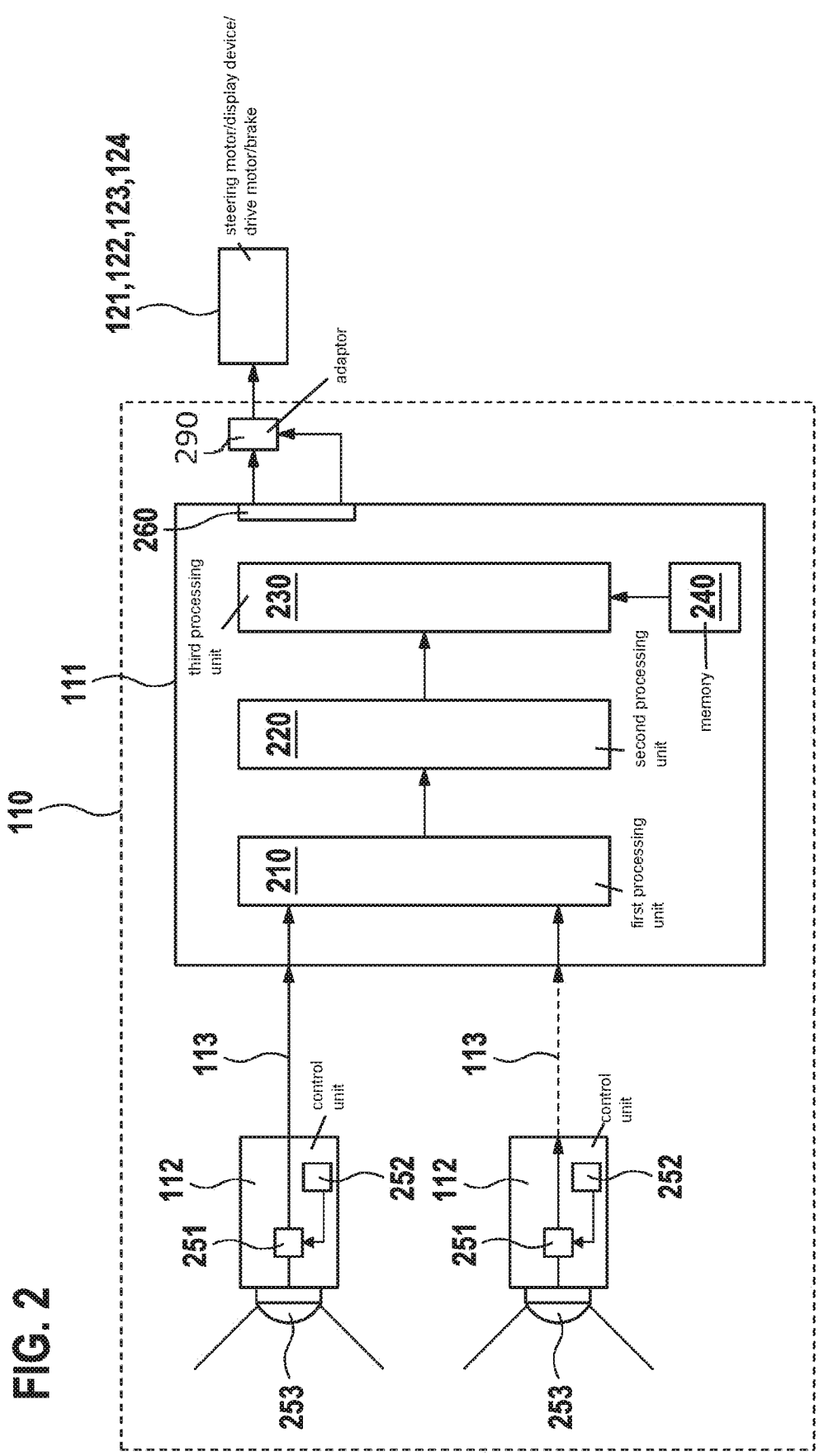
FIG. 2 shows a camera system having a control unit.

FIG. 2 shows camera system 110. Camera system 110 has two cameras 112 and a control unit 111 as well as data cables 113 between cameras 112 and control unit 111 for the transmission of the image data, the image data in particular being serialized image data. Camera 112 has an optical system 253 in each case, a serializer 251 or a camera processing unit 251 and an electronic camera memory 252. Using camera optical system 253, camera processing unit 251 acquires a camera image during a normal operation. Camera processing unit 251 or serializer 251 subsequently generates the image data as a function of the acquired camera image, in particular serialized image data that represent the acquired camera image and are capable of being transmitted. According to the present invention, camera processing unit 251 is configured to first load at least a source image as a test image from electronic camera memory 252 after control unit 111 and/or camera 112 has/have been switched on, and to generate the image data as a function of the loaded source image, the image data representing the source image and being transmittable, e.g., using data cable 113. Control unit 111 of camera system 110 receives these image data, in particular with the aid of a receiving unit, the image data particularly being received in a serialized manner. Control unit 111 includes at least one processing unit 210, which acquires the image data of camera 112 transmitted via data cable 113. First processing unit 210 or deserializer 210 of control unit 111 subsequently generates an intermediate image as a function of the acquired image data, in particular the serialized image data. Second processing unit 220 of control unit 111 acquires the generated intermediate image and ascertains a processed image as a function of the generated intermediate image. Third processing unit 230 of control unit 111 compares the ascertained processed image to at least one reference image, the reference image being loaded from a memory 240 of control unit 111. The reference image represents an expected image for the image processed as a function of the loaded transmission test image. In the event of a deviation between the processed image and the reference image, control unit 111 or third processing unit 230 generates an error signal. The error signal represents a malfunction of control unit 111 or the image chain between camera 112 and control unit 111. For example, the generated error signal is configured to adapt a control signal, which is generated by control unit 111, e.g., for the control of the vehicle, and in particular to suppress the control signal. Toward this end, an optional adaptation means (adaptor) 290 may be provided, which adapts the control signal as a function of the error signal. In a possible further development, first processing unit 210, second processing unit 220 and/or third processing unit 230 may be replaced by a common processing unit 210, 220 and 230. It may be provided that at least one further processing unit is positioned between third processing unit 230 and an output interface 260 of control unit 111. For instance, this further processing unit is used to determine the optical flow and/or to ascertain the control signal as a function of an acquired camera image or a series of camera images (not illustrated).

A sequence of the testing method for an image chain of control unit 111 of a camera system 110 is shown in FIG. 3 in the form of a block diagram. To begin with, an optional activation of control unit 111 takes place. Control unit 111 then boots up in step 310. The operating system of control unit 111 is loaded during booting 310. In a step 311, camera 112 then generates the image data with the aid of camera processing unit 251 as a function of a source image loaded from a camera memory 252, especially immediately after loading 310 of the operating system has ended. These image data, in particular serialized image data, are transmitted in a next step from camera 112 to control unit 111. Accordingly, control unit 111 receives the image data from camera 112 in step 320. The receiving 320 of the image data takes place in particular with the aid of the camera interfaces, data cable 113 and a control unit interface. Alternatively, the receiving or transmitting 320 may be carried out without a cable by using a radio link between control unit 111 and camera 112, e.g., via a WLAN or Bluetooth connection. The image data received from control unit 111 represent at least the source image loaded from electronic camera memory 252 of camera 112. In step 330, an intermediate image is generated as a function of the received image data, in particular by a deserialization. In a fault-free transmission of the serialized image data, the loaded source image is particularly reproduced again as an intermediate image by the generation 330 of the intermediate image. This is followed by an ascertainment 350 of a processed image as a function of the generated intermediate image. During ascertainment 350 of the processed image, a transformation of the intermediate color image into a gray scale image, for example, or an adaptation of a brightness of the image pixels and/or filtering of image noise of the intermediate image is/are carried out. This may optionally be followed by an ascertainment 351 of a first check sum as a function of image information of at least two image pixels of the processed image, the image information being allocated to an image pixel in each case. The image information, for instance, is a gray scale value and/or a brightness and/or a descriptive measure for the environment of the image pixel. In addition, an optional ascertainment 352 of a second check sum may be carried out as a function of the image information of at least two image pixels of the reference image. The reference image is loaded from memory 240 of control unit 111. A comparison 360 of the processed image with the reference image then takes place. The processed image is preferably compared to the reference image as a function of the ascertained first check sum and/or the ascertained second check sum. In step 370, an error signal is generated in the event of a deviation between the processed image and the reference image. In an optional further development, it may be the case that the control device acquires at least one camera image of camera 112 in step 375, acquiring 375 in particular being carried out with the aid of a camera optical system 253. In subsequent optional step 380, a control signal is generated as a function of the acquired camera image or a sequence of camera images of camera 112. The optionally generated control signal is configured to actuate steering motor 121, drive motor 123, brake 124 and/or display device 122. This is optionally followed by adaptation 390 of the control signal as a function of the generated error signal using an optional adaptation means 290.

The invention claimed is:

1. A testing method for a camera system having a control unit and at least one camera, the method comprising the following steps:
after loading of an operating system of the control unit, performing the following steps:
receiving by the control unit image data from the camera of the camera system, the image data representing a source image loaded from a camera memory of the camera;
generating an intermediate image as a function of the image data received from the control unit;
ascertaining a processed image as a function of the generated intermediate image;
ascertaining a first check sum as a function of image information of at least two image pixels of the processed image;
ascertaining a second check sum as a function of the image information of at least two image pixels of at least one reference image;
comparing the processed image to the reference image as a function of the first check sum and the second check sum; and
generating an error signal in the event of a deviation between the processed image and the reference image;
generating a control signal of the control unit as a function of a camera image acquired by the camera, the control signal being configured to actuate at least one of: a steering motor of a vehicle having the camera system, a drive motor of the vehicle, a brake of the vehicle, or a display device of the vehicle; and
adapting the control signal as a function of the generated error signal.

2. The testing method as recited in claim 1, wherein the at least one source image represents a test pattern, the test pattern having different brightness values, and/or different gray values, and/or different pixel environments and/or different color values.

3. A testing method for a camera system having a control unit and at least one camera, the method comprising the following steps:
immediately after loading of an operating system of the control unit, performing the following steps:
generating transmittable image data as a function of at least one source image loaded from an electronic camera memory of the camera;
transmitting the generated image data from the camera to the control unit;
generating an intermediate image as a function of the image data received by the control unit;
ascertaining a processed image as a function of the generated intermediate image;
ascertaining a first check sum as a function of image information of at least two image pixels of the processed image, the image information being allocated to an image pixel in each case, the image information being at least one of: a gray scale value, a brightness, or a descriptive measure for the environment of the image pixel;
ascertaining a second check sum as a function of the image information of at least two image pixels of at least one reference image;
comparing the processed image to the reference image, the reference image being loaded from a memory of the control unit, the comparing the processed image to the reference image being as a function of the first check sum and/or the second check sum; and
generating an error signal in the event of a deviation between the processed image and the reference image.

4. The testing method as recited in claim 1, wherein the ascertaining of the at least one processed image is carried out as a function of test parameters.

5. The testing method as recited in claim 3, wherein the following method steps are carried out after the error signal has been generated:
acquiring at least one camera image of the camera;
generating a control signal of the control unit as a function of the acquired camera image, the control signal being configured to actuate a steering motor of a vehicle having the camera system, and/or a drive motor of the vehicle, and/or a brake of the vehicle, and/or a display device of the vehicle; and
adapting the control signal as a function of the generated error signal.

6. A control unit for a camera system, the control unit being configured to:
after loading of an operating system of the control unit:
receive image data from a camera of the camera system using a receiving unit, the image data representing a source image loaded from a camera memory of the camera;
generate an intermediate image as a function of the received image data;
ascertain a processed image as a function of the generated intermediate image;
ascertain a first check sum as a function of image information of at least two image pixels of the processed image;
ascertaining a second check sum as a function of the image information of at least two image pixels of at least one reference image;
comparing the processed image to the reference image as a function of the first check sum and the second check sum; and
generate an error signal in the event of a deviation between the processed image and the reference image; and
upon detecting an error represented in the error signal, prevent control of a vehicle by a control signal of the control unit, the control signal being a function of an acquired camera image of the camera.

7. A camera system, comprising:
at least one camera; and
a control unit configured to:
after loading of an operating system of the control unit:

receive image data from the camera using a receiving unit, the image data representing a source image loaded from a camera memory of the camera;

generate an intermediate image as a function of the received image data;

ascertain a processed image as a function of the generated intermediate image;

ascertain a first check sum as a function of image information of at least two image pixels of the processed image;

ascertain a second check sum as a function of the image information of at least two image pixels of at least one reference image;

compare the processed image to the reference image as a function of the first check sum and the second check sum; and generate an error signal in the event of a deviation between a processed image and a reference image; and upon detecting an error represented in the error signal, prevent control of a vehicle by a control signal of the control unit, the control signal being a function of an acquired camera image of the camera.

8. A vehicle, comprising:
a camera system including:
at least one camera; and
a control unit configured to:
after loading of an operating system of the control unit:
receive image data from the camera using a receiving unit, the image data representing a source image loaded from a camera memory of the camera;

generate an intermediate image as a function of the received image data;

ascertain a processed image as a function of the generated intermediate image;

ascertain a first check sum as a function of image information of at least two image pixels of the processed image;

ascertain a second check sum as a function of the image information of at least two image pixels of at least one reference image;

compare the processed image to the reference image as a function of the first check sum and the second check sum; and generate an error signal in the event of a deviation between a processed image and a reference image; and upon detecting an error represented in the error signal, prevent control of a vehicle by a control signal of the control unit, the control signal being a function of an acquired camera image of the camera.

9. A testing method for a camera system having a control unit and at least one camera, the method comprising the following steps:

after loading of an operating system of the control unit, performing the following steps:
receiving image data from the camera of the camera system, the image data representing a source image loaded from a camera memory of the camera;

generating an intermediate image as a function of the image data received from the control unit;

ascertaining a processed image as a function of the generated intermediate image;

ascertaining a first check sum as a function of image information of at least two image pixels of the processed image;

reading a second check sum from memory, the second check sum being a function of image information of at least two image pixels of at least one reference image;

comparing the processed image to at least one reference image as a function of the first check sum and the second check sum; and generating an error signal in the event of a deviation between the processed image and the reference image; and upon detecting an error represented in the error signal, preventing control of a vehicle by a control signal of the control unit.

10. The testing method as recited in claim 9, wherein the control signal is generated as a function of an acquired camera image, and configured to actuate at least one of: a steering motor of a vehicle having the camera system, a drive motor of the vehicle, a brake of the vehicle, or a display device of the vehicle.

11. The testing method as recited in claim 1, wherein the adapting the control signal as a function of the generated error signal suppresses the control signal.

* * * * *